United States Patent
Li et al.

(10) Patent No.: US 8,769,620 B2
(45) Date of Patent: Jul. 1, 2014

(54) METHOD, SYSTEM, AND TERMINAL FOR USING SUBSCRIPTION SERVICE CONTENT

(75) Inventors: Qingliang Li, Shenzhen (CN); Zijing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 12/978,042

(22) Filed: Dec. 23, 2010

(65) Prior Publication Data

US 2011/0093929 A1 Apr. 21, 2011

Related U.S. Application Data

(63) Continuation of application No. PCT/CN2009/071482, filed on Apr. 27, 2009.

(30) Foreign Application Priority Data

Jun. 26, 2008 (CN) .......................... 2008 1 0126202

(51) Int. Cl.
| | |
|---|---|
| *G06F 15/16* | (2006.01) |
| *G06F 17/30* | (2006.01) |
| *G06F 7/04* | (2006.01) |
| *H04L 29/06* | (2006.01) |
| *G06F 21/00* | (2013.01) |

(52) U.S. Cl.
USPC ...................... 726/4; 726/3; 726/28; 713/182

(58) Field of Classification Search
USPC .......... 713/168–174, 182–186, 202; 709/225, 709/229; 726/2–8
See application file for complete search history.

(56) References Cited

U.S. PATENT DOCUMENTS

| | | | |
|---|---|---|---|
| 8,234,302 B1 * | 7/2012 | Goodwin et al. ............. | 707/783 |
| 2002/0032784 A1 * | 3/2002 | Darago et al. ................ | 709/229 |
| 2004/0176098 A1 * | 9/2004 | Besset-Bathias et al. . | 455/452.2 |
| 2005/0114711 A1 * | 5/2005 | Hesselink et al. ............ | 713/201 |
| 2007/0050630 A1 * | 3/2007 | Kumar et al. ................. | 713/182 |

(Continued)

FOREIGN PATENT DOCUMENTS

| | | |
|---|---|---|
| CN | 1855926 A | 11/2006 |
| CN | 101146243 A | 3/2008 |

(Continued)

OTHER PUBLICATIONS

Written Opinion of the International Searching Authority issued in corresponding PCT Patent Application No. PCT/CN2009/071482, mailed Jul. 30, 2009.

(Continued)

*Primary Examiner* — Evans Desrosiers

(74) *Attorney, Agent, or Firm* — Brinks, Gilson & Lione

(57) ABSTRACT

A method and system for using subscription service content are provided. The method includes: receiving a registration request for using subscription service content transmitted from a user terminal, where the registration request carries an identifier (ID) of the user terminal; determining whether the registered number of the user terminals using the subscription service content registered by a user is greater than the maximum number of the user terminals permitted to use the subscription service content according to the ID of the user terminal, and if not, activating the user terminal according to the ID of the user terminal; and providing authorization for permission of using the service content for the activated user terminal. Through the provided technical solutions, a user is capable of conveniently using the service content at different terminals while unauthorized spread of the service content is avoided during network handover of a user equipment (UE).

9 Claims, 4 Drawing Sheets

(56) References Cited

U.S. PATENT DOCUMENTS

2008/0092213 A1 4/2008 Wei et al.
2012/0090018 A1* 4/2012 Padhye et al. .................. 726/4

FOREIGN PATENT DOCUMENTS

| CN | 101159570 A | 4/2008 |
|----|-------------|--------|
| CN | 101321074 A | 12/2008 |
| CN | 101321074 B | 12/2008 |
| WO | 2005/104500 A1 | 11/2005 |

OTHER PUBLICATIONS

International Search Report issued in corresponding PCT Application No. PCT/CN2009/071482; mailed Jul. 30, 2009.

* cited by examiner

METHOD, SYSTEM, AND TERMINAL FOR USING SUBSCRIPTION SERVICE CONTENT

CROSS-REFERENCE TO RELATED APPLICATIONS

This application is a continuation of International Application No. PCT/CN2009/071482, filed on Apr. 27, 2009, which claims priority to Chinese Patent Application No. 200810126202.5, filed on Jun. 26, 2008, both of which are hereby incorporated by reference in their entireties.

FIELD OF THE DISCLOSURE

The present disclosure relates to the field of Internet communications technologies, and more particularly, to a method and a system for using subscription service content.

BACKGROUND

With the advent of the network era, various content distribution technologies keep emerging, and information sharing can be easily achieved with the aid of existing networks and technologies. A variety of industries involving networks are developing prosperously and operators providing services to users by means of networks appear accordingly. The operators provide various services to the users through the networks, and the users can use the services provided by the operators after paying a certain fee to the operators. The content provided by content providers is the core of the services provided by the operators, and the users purchase the content from the operators and use the content through a user terminal.

In order to protect interests of the operators and the content providers, a content protection system appears accordingly, where content protection is achieved by the a content protection system through content encryption and access control, so the interests of the operators and the content providers are protected to a certain degree and unauthorized spread of the contents is constrained.

For example, after a user pays a certain fee to an operator to purchase content from the operator, the operator distributes unencrypted content to an authorized user terminal through a network. After obtaining the content, the authorized user terminal may use the content or forward the content at will, for example, to other authorized terminals or unauthorized terminals. As the content is unencrypted, each terminal can process the content, and such a situation where the content is uncontrollable is a fatal blow to the operators and content providers.

Due to the disadvantages of the above technical solutions, the operators introduce a content protection system in their operation schemes. After a user pays a certain fee to an operator to purchase content from the operator, the operator encrypts the content by using the content protection system, and distributes the encrypted content and authorization to authorized user terminal through a network. When obtaining the encrypted content only, the authorized user terminal still cannot process the contents normally, and the user terminal can only normally process the encrypted content when acquiring the authorization of the operator at the same time. The so-called authorization is that the operator grants a right of using a subscribed service to a user, and the authorization has various forms, for example, the authorization may include a content decryption key, or a deadline of using the content by the user. As for the authorization, different content protection vendors have different definitions, but one thing in common is that the user can only normally use the subscribed contents after obtaining the authorization of the operator.

The authorization may be locally stored in the terminal, and each vendor performs security processing on the local authorization to prevent the authorization from unauthorized replication. Some vendors think that authorization locally stored in the terminal is less secure than authorization stored in a server at an operator side, so the vendors store the authorization in the server at the operator side. The user terminal needs to apply for the authorization from the server before decrypting the content, and a server end delivers the authorization to the user terminal after verifying validity of the user terminal. In a word, the authorization cannot be forwarded at will, and an unauthorized terminal or an authorized terminal that does not subscribe to the corresponding service cannot acquire the authorization.

According to the existing technical solutions above, though the content is prevented from unauthorized spread, the content protection also brings inconveniences to the terminal users. In a current operation scheme, it is assumed that a user has (1+n) terminals, and when the user uses an account number 1 to subscribe to encrypted content for a terminal 1, the user can only use the content on the terminal 1. If the user uses a terminal (1+n) to process the encrypted content, a new account number (1+n) has to be created and a complete account opening and subscription operation is repeated to use the same content on the terminal (1+n). That is, different terminals of the same user cannot conveniently share authorization of the content subscribed by the user, so that the user cannot conveniently use the subscribed content on multiple terminals. Therefore, this operation scheme causes enormous inconveniences to the use of the service by the user, influences user experience, reduces a satisfaction degree of the customer, and harms the interests of the operators and content providers.

SUMMARY

An embodiment of the present invention provides a method for using subscription service content, which includes:

receiving a registration request for using subscription service content transmitted from a user terminal, where the registration request carries an identifier (ID) of the user terminal;

determining whether the registered number of the user terminals using the subscription service content registered by a user is greater than the maximum number of the user terminals permitted to use the subscription service content according to the ID of the user terminal, and if the number of the registered user terminals using the subscription service content registered by a user is not greater than the maximum number of the user terminals permitted to use the subscription service content, activating the user terminal according to the ID of the user terminal; and providing authorization for permission of using the service content to the activated user terminal.

An embodiment of the present invention further provides a method for using subscription service content, which includes:

receiving a service subscription request transmitted from a user terminal, where the request carries an ID of the user terminal; and determining whether the user terminal is an activated terminal according to the ID of the user terminal, if the user terminal is an activated terminal, allocating authorization to the user terminal.

An embodiment of the present invention further provides a method for using subscription service content, which includes:

transmitting a service subscription request to an operation support system, where the request carries an ID of a user terminal; and receiving authorization which is allocated to the user terminal by the operation support system according to the ID of the user terminal, and using the subscription service content according to the authorization.

An embodiment of the present invention further provides a system for using subscription service content, which includes:

a content protection system, configured to receive a registration request transmitted from a user terminal; determine whether the number of the registered user terminals using the subscription service content registered by a user is greater than the maximum number of the user terminals permitted to use the subscription service content according to an ID of the user terminal carried in the registration request, and if the number of the registered user terminals using the subscription service content registered by a user is not greater than the maximum number of the user terminals permitted to use the subscription service content, activate the user terminal according to the ID of the user terminal; and provide authorization for permission of using the service content to the activated user terminal.

An embodiment of the present invention further provides a content protection system, which includes:

a receiving unit, configured to receive a registration request transmitted from a user terminal, where the registration request carries an ID of the user terminal;

a determination unit, configured to determine whether the number of the registered user terminals using the subscription service content registered by a user is greater than the maximum number of the user terminals permitted to use the subscription service content according to the registration request received by the receiving unit; and an activation unit, configured to activate the user terminal when a determination result of the determination unit is that the number of the registered user terminals using the subscription service content registered by a user is not greater than the maximum number of the user terminals permitted to use the subscription service content.

An embodiment of the present invention further provides an operation support system, which includes:

a receiving unit, configured to receive a service subscription request transmitted from a user terminal, where the request carries an ID of the user terminal;

a determination unit, configured to determine whether the user terminal is an activated terminal according to the ID of the user terminal; and an authorization unit, configured to allocate authorization to the user terminal when a determination result of the determination unit is that the user terminal is an activated terminal.

An embodiment of the present invention further provides a terminal, which includes:

a transmission unit, configured to transmit a service subscription request to an operation support system, where the request carries an ID of a user terminal;

a receiving unit, configured to receive authorization which is allocated to the user terminal by the operation support system according to the ID of the user terminal; and a using unit, configured to use the subscription service content according to the authorization received by the receiving unit.

Persons of ordinary skill in the art should understand that all or a part of the steps of the method according to the embodiments of the present invention may be implemented by a computer program instructing relevant hardware. The program may be stored in a computer readable storage medium. When the program is run, the steps of the method according to the embodiments of the present invention are performed. The storage medium may be such as a magnetic disk, an optical disk, a Read-Only Memory (ROM), or a Random Access Memory (RAM).

According to the method and system for using the subscription service content in the embodiments of the present invention, when the user terminal needs to use the subscription service content, if the number of the user terminals using the subscription service content registered by the user is not greater than the maximum number of the user terminals permitted to use the subscription service content, the user terminal is activated, so that the user terminal can acquire the authorization from the content protection system, and use the service content according to the authorization, so the user can conveniently use the subscription service content at different terminals and unauthorized spread of the service content is avoided.

BRIEF DESCRIPTION OF THE DRAWINGS

To illustrate the embodiments of the present invention, the accompanying drawings needed for describing the embodiments are introduced briefly in the following. The accompanying drawings in the following description provide only some embodiments of the present invention, and persons of ordinary skill in the art can derive other drawings from the accompanying drawings without creative efforts.

DETAILED DESCRIPTION OF THE EMBODIMENTS

In the implementation of the present invention, the inventors find that the prior art has at least the following problems. As different user terminals of a same user cannot conveniently share authorization of content subscribed by the user, the user cannot conveniently use the subscribed content on multiple terminals.

The technical solutions of the embodiments of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
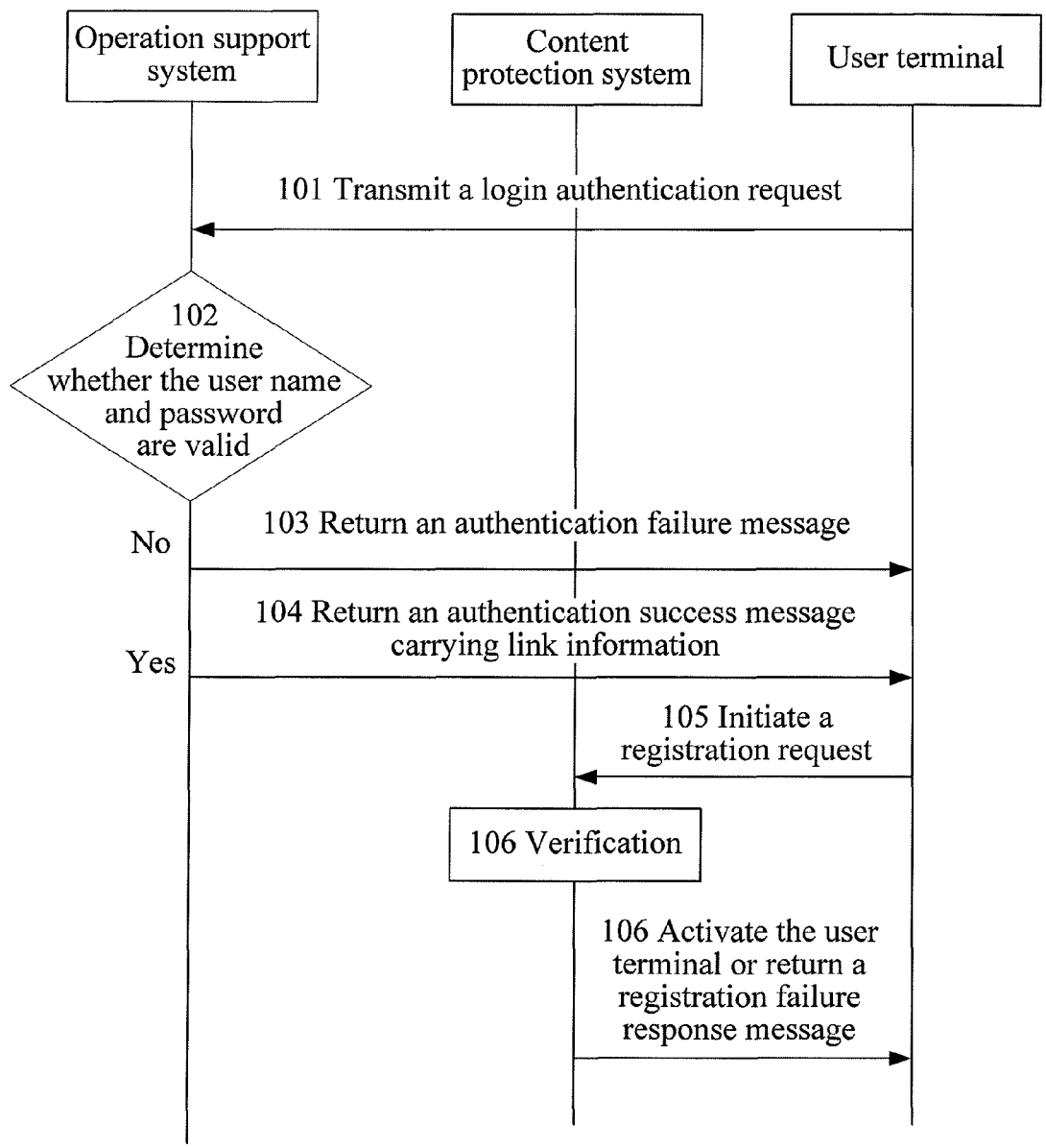
FIG. 1 is a flow chart of a process in which a user terminal registers to use a service content service according to an embodiment of the present invention.

FIG. 1 is a flow chart of a process in which a user terminal registers to use a service content service according to an embodiment of the present invention.

Before registering to use the service content, the user terminal needs to open an account through an operation support system to acquire a user name and a password, and provide the maximum number of the user terminals permitted to use the subscription service content by a user to a content protection system. The user terminal may be a permanent terminal or a temporary terminal.

If the user is not specifically designated, maximum numbers of the permanent terminals and the temporary terminals permitted to use the subscription service content by the user may be set following a default configuration of an operator, for example, a default value of the number of the permanent terminals is 2, and a default value of the number of the temporary terminals is 1.

The permanent terminal is a terminal permanently used by a user. If the user needs to change the number of the permanent terminals or replace the permanent terminal, the user may make application to the operation support system. When authorization is locally stored in a terminal in a content protection scheme used by an operator, the permanent terminal may locally store authorization of a subscribed service of a user, so the user can process subscribed content on line or off line on multiple permanent terminals.

The temporary terminal is a terminal temporarily used by a user, and a certain specific terminal is not bound. If the user needs to change the number of the temporary terminals, the user may make application to the operation support system. Authorization of a subscribed service of a user cannot be locally stored in a temporary terminal, so the user can only use the subscribed service on line. The operation support system can customize whether a same user is permitted to have multiple temporary terminals, that is, whether a same user can have multiple temporary terminals to process the content on line at the same time.

A specific process in which a user terminal registers to use a service content service includes the following processes.

In process 101, a user transmits a login authentication request to an operation support system through a user terminal.

When a user powers on and uses a permanent terminal or a temporary terminal for the first time, the user inputs a user name and a password, and selects a type of the terminal. The user terminal then transmits a login authentication request to an operation support system, where the login authentication request message contains the user name and the password.

In process 102, the operation support system resolves the login authentication request message transmitted from the user terminal to acquire the user name and password, and determines whether the user name and password are valid, if the user name and password are valid, process 104 is performed, and if the user name and password are not valid, process 103 is performed.

In process 103, the operation support system returns an authentication failure message to the user terminal, and the registration process initiated by the user terminal is completed.

In process 104, the operation support system returns an authentication success response message to the user terminal, where the message carries information for instructing the user terminal to register with a content protection system, and the information may include a registration address or port information of the content protection system.

In process 105, the user terminal initiates a registration request to the content protection system according to the registration address and the port information in the information, where the registration request carries a user name of the user that the user terminal belongs to, a terminal type, and a unique ID of the terminal.

The unique ID of the terminal may be a unique ID of hardware of the user terminal, for example, a Media Access Control (MAC) address of the user terminal, and a sequence number of the user terminal.

In process 106, the content protection system resolves the registration request message transmitted from the user terminal, performs relevant verification, and activates the user terminal or returns a registration failure message to the user terminal according to a verification result.

The specific process includes the following processes.

(a) The content protection system resolves the registration request message, so as to acquire the user name, the terminal type, and the unique ID of the terminal.

(b) It is determined whether the user terminal is already registered in the content protection system, if the user terminal is not registered in the content protection system, process c is performed, and if the user terminal is already registered in the content protection system, process h is performed.

(c) It is determined whether the terminal that newly initiates the registration request is a permanent terminal or a temporary terminal, if it is a permanent terminal, process d is performed, and if it is a temporary terminal, process e is performed.

(d) It is verified whether the number of the registered permanent terminals of the user reaches an upper limit, if the number of the registered permanent terminals of the user reaches an upper limit, process h is performed, and if the number of the registered permanent terminals of the user does not reach an upper limit, process f is performed.

(e) It is verified whether the number of the registered temporary terminals of the user reaches an upper limit, if the number of the registered temporary terminals of the user reaches an upper limit, process g is performed, and if the number of the registered temporary terminals of the user does not reach an upper limit, process f is performed.

(f) The user terminal is activated.

The unique ID of the terminal and the terminal type of the user terminal that initiates the registration request are recorded in a database, and are bound with the user, and an indicator of the terminal is set to an activation status, indicating that the terminal can normally perform service subscription and content using.

(g) The newly registered temporary terminal of the user replaces the originally registered temporary terminal of the user, so a unique ID, and a terminal type of the new temporary terminal are recorded, the temporary terminal is bound with the user, and an indicator of the terminal is set to an activation status. In this case, the temporary terminal may also normally perform service subscription and content using.

(h) The user terminal that newly initiates the registration request is unauthorized, so the content protection system returns a registration failure message to the user terminal.

Figure 2:
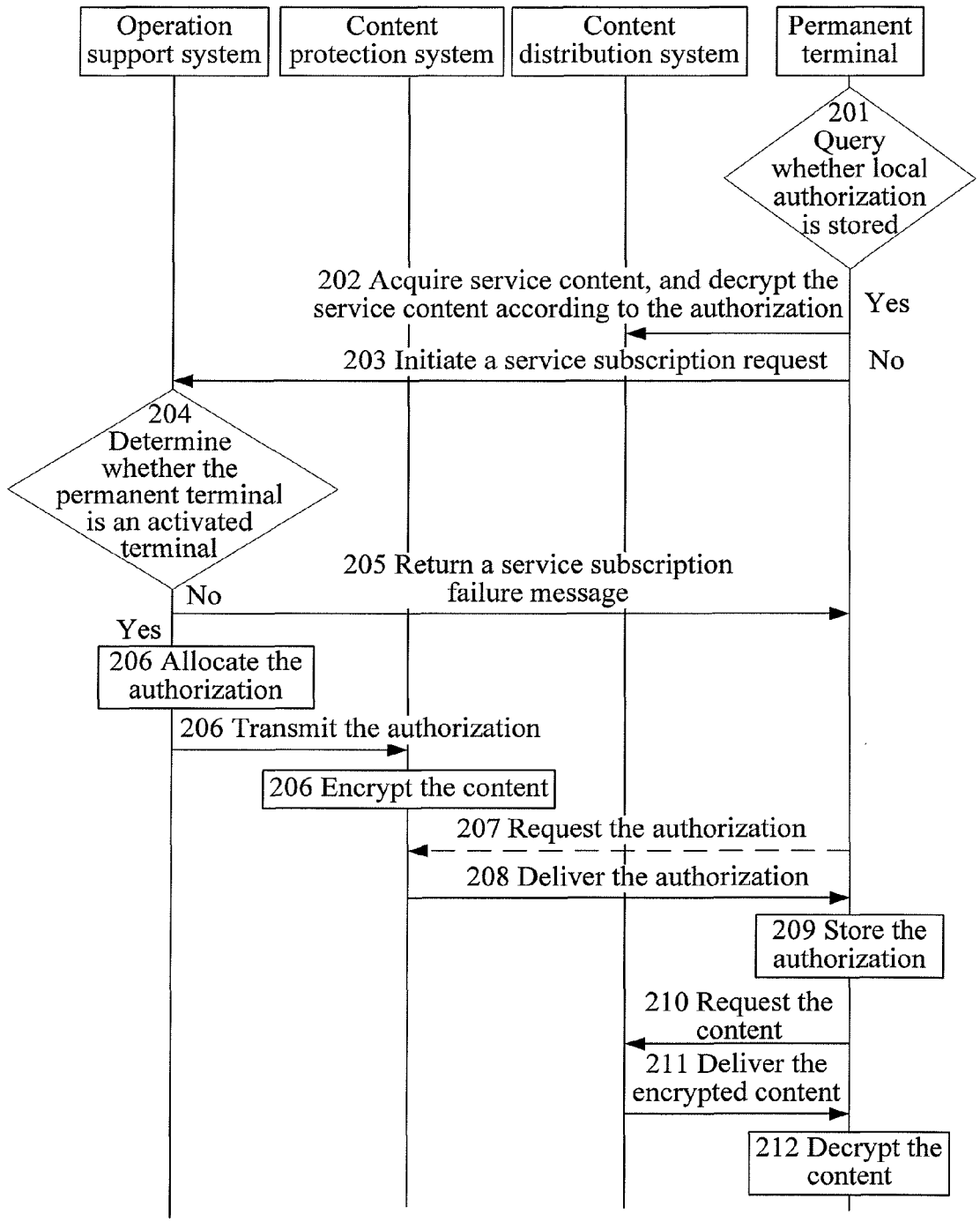
FIG. 2 is a flow chart of a method for using service content according to an embodiment of the present invention.

FIG. 2 is a flow chart of a method for achieving using of service content by a user at different terminals according to a first embodiment of the present invention. In this embodiment, a user terminal is a permanent terminal.

A specific process includes the following processes.

In process 201, when a user prepares to process service content through a permanent terminal, the user locally queries whether authorization of the content is stored in the permanent terminal, if authorization of the content is stored in the permanent terminal, process 202 is performed, and if authorization of the content is not stored in the permanent terminal, process 203 is performed.

In process 202, the service content is acquired from a content distribution system and decrypted the acquired service content according to the locally stored authorization.

On-line decryption or off-line decryption may be adopted.

In process 203, the permanent terminal initiates a service subscription request to an operation support system, where the request message carries a unique ID of the terminal;

In process 204, the operation support system determines whether the permanent terminal is an activated terminal according to the service subscription request, if the permanent terminal is an activated terminal, process 206 is performed, and if the permanent terminal is not an activated terminal, process 205 is performed.

A specific mode of determining whether the permanent terminal is an activated terminal may be as follows.

The operation support system transmits a query request to a content protection system to query whether the user terminal is an activated terminal, where the query request contains the ID of the permanent terminal.

The content protection system acquires an activation status of the permanent terminal according to the ID of the permanent terminal, and returns an activation notification to the operation support system.

In process 205, a service subscription failure response message is returned to the permanent terminal.

In process 206, the operation support system allocates the authorization to the permanent terminal.

A specific mode that the operation support system allocates the authorization to the permanent terminal is that the operation support system notifies the content protection system of permitting the permanent terminal to acquire the authorization of the service.

In process 207, when the content protection system passively delivers the authorization, the permanent terminal actively requests the authorization from the content protection system, and when the content protection system actively delivers the authorization, process 207 may be omitted.

In process 208, the content protection system delivers the authorization to the permanent terminal.

The authorization may be a key for decryption of an encrypted content in the content protection system.

In process 209, the permanent terminal locally stores the authorization.

In process 210, the permanent terminal requests the content from the content distribution system.

In process 211, the content distribution system delivers the content encrypted by the content protection system to the permanent terminal.

In process 212, the permanent terminal decrypts the encrypted content according to the locally stored authorization.

The content may be decrypted on line or off line.

Figure 3:
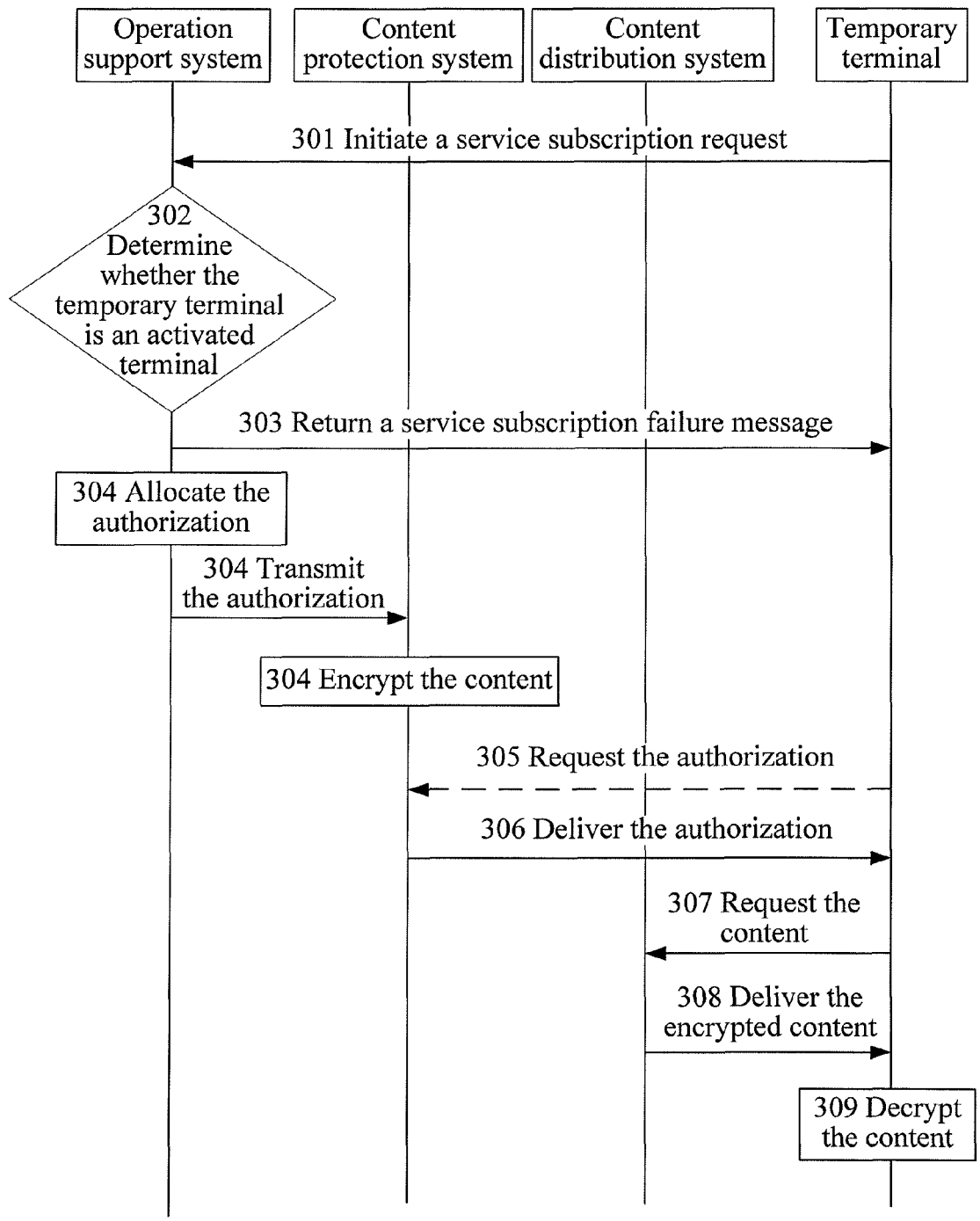
FIG. 3 is a flow chart of a method for using service content according to an embodiment of the present invention.

FIG. 3 is a flow chart of a method for achieving using of service content by a user at different terminals according to a second embodiment of the present invention. In this embodiment, a user terminal is a temporary terminal.

A specific process includes the following processes.

In process 301, a temporary terminal initiates a service subscription request to an operation support system, where the request message carries a unique ID of the temporary terminal.

The unique ID of the temporary terminal may be a unique ID of hardware of the user terminal, for example, an MAC address of the user terminal, and a sequence number of the user terminal.

In process 302, the operation support system determines whether the temporary terminal is an activated terminal according to the service subscription request, if the temporary terminal is an activated terminal, process 304 is performed, and if the temporary terminal is not an activated terminal, process 303 is performed.

A specific mode that the determining whether the temporary terminal is an activated terminal may be as follows.

The operation support system transmits a query request to query whether the user terminal is an activated terminal to a content protection system, where the query request carries the ID of the temporary terminal.

The content protection system acquires an activation status of the temporary terminal according to the ID of the temporary terminal, and returns an activation notification to the operation support system.

In process 303, a service subscription failure response message is returned to the temporary terminal.

In process 304, the operation support system allocates authorization to the temporary terminal.

A specific mode that the operation support system allocates the authorization to the temporary terminal may be that the operation support system notifies the content protection system of permitting the temporary terminal to acquire the authorization of the service.

In process 305, when the content protection system passively delivers the authorization, the temporary terminal actively requests the content authorization from the content protection system, and when the content protection system actively delivers the authorization, process 305 may be omitted.

In process 306, the content protection system delivers the authorization to the temporary terminal.

The authorization may be a key for decryption of encrypted content in the content protection system.

In process 307, the temporary terminal requests the content from the content distribution system.

In process 308, the content distribution system delivers the content encrypted by the content protection system to the temporary terminal.

In process 309, the temporary terminal decrypts on line the content according to the authorization received from the content protection system.

Additionally, the temporary terminal may regularly queries whether the status of the temporary terminal is an activation status, if the status of the temporary terminal is an activation status, the subscribed content can be normally processed, and if the status of the temporary terminal is not an activation status, processing of the content subscribed by the user is prohibited.

The temporary terminal may regularly initiate a status query request to the content protection system, and the content protection system then returns the status of the temporary terminal according to the query request, or the content protection system actively and regularly delivers the status of the temporary terminal to the temporary terminal.

Figure 4:
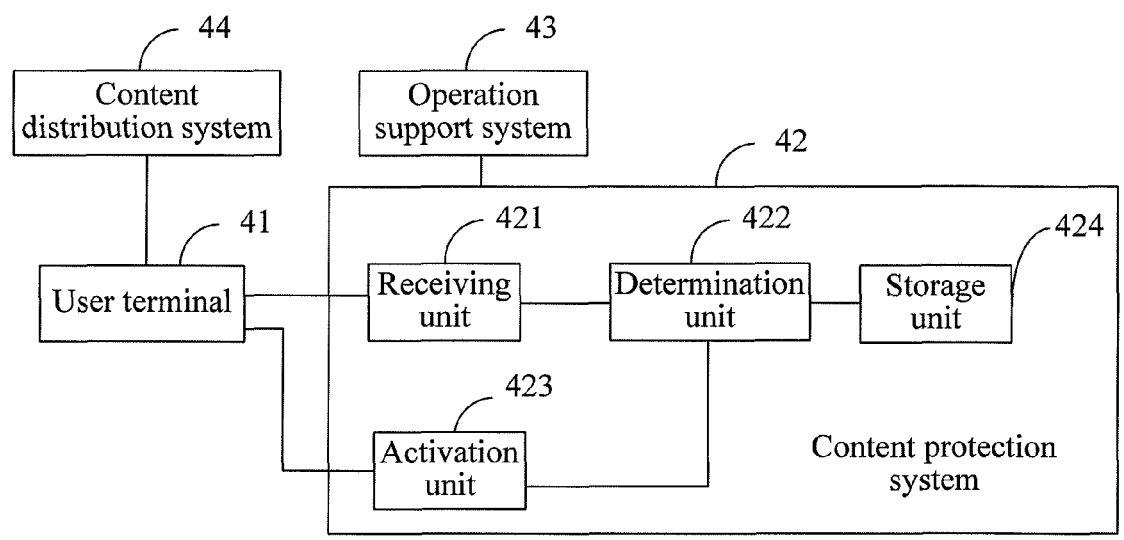
FIG. 4 is a schematic structural view of a system for using service content according to an embodiment of the present invention.

FIG. 4 is a schematic structural view of a system for achieving using of subscription service content by a user at different terminals according to an embodiment of the present invention.

The system for achieving using of subscription service content by a user at different terminals includes a user terminal 41, a content protection system 42, an operation support system 43, and a content distribution system 44.

The user terminal 41 is configured to transmit a registration request for using the subscription service content to the content protection system 42, where the registration request carries an ID of the user terminal.

The content protection system 42 is configured to receive the registration request transmitted from the user terminal 41, determine whether the number of the registered user terminals using the subscription service content registered by a user is greater than the maximum number of the user terminals permitted to use the subscription service content according to the ID of the user terminal carried in the registration request, activate the user terminal 41 according to the ID of the user terminal if the number of the registered user terminals using the subscription service content registered by a user is not greater than the maximum number of the user terminals permitted to use the subscription service content, and deliver authorization to the activated user terminal, so that the user uses the service content according to the authorization.

The operation support system 43 is configured to receive a service subscription request transmitted from the user terminal, where the request contains the ID of the user terminal, acquire whether the user terminal is an activated terminal according to the ID of the user terminal through the content protection system 42, and notify the content protection system 42 of permitting the terminal to acquire the authorization of the service if the user terminal is an activated terminal.

The operation support system 43 is further configured to provide the maximum number of the user terminals permitted to use the subscription service content by the user to the content protection system 42.

The content distribution system 44 is configured to deliver encrypted service content to the user terminal 41 according to a service content request transmitted from the user terminal 41.

The content protection system 42 may further include a receiving unit 421, a determination unit 422, and an activation unit 423.

The receiving unit 421 is configured to receive the registration request transmitted from the user terminal 41, where the registration request carries the ID of the user terminal.

The registration request may further carry, for example, a user name and a type of the user terminal.

The determination unit 422 is configured to determine whether the number of the registered user terminals using the subscription service content registered by the user is greater than the maximum number of the user terminals permitted to use the subscription service content according to the registration request received by the receiving unit 421.

The activation unit 423 is configured to activate the user terminal 41 when a determination result of the determination unit 422 is that the number of the registered user terminals using the subscription service content registered by the user is not greater than the maximum number of the user terminals permitted to use the subscription service content.

The content protection system 42 may further include a storage unit 424.

The storage unit 424 is configured to store the maximum number of the user terminals permitted to use the subscription service content provided by the operation support system, and provide the maximum number to the determination unit 422 for determination.

The content protection system 42 may further include a registration status and terminal type determination unit.

The registration status and terminal type determination unit is configured to determine whether the user terminal is already registered in the content protection system, return a registration failure message to the user terminal if the user terminal is already registered in the content protection system, or further determine whether the user terminal is a permanent terminal or a temporary terminal if the user terminal is not registered in the content protection system, notify the determination unit 422 to determine whether the number of the registered permanent terminals using the subscription service content registered by the user is greater than the maximum number of the permanent terminals permitted to use the subscription service content if the user terminal is a permanent terminal, and notify the determination unit 422 to determine whether the number of the registered temporary terminals using the subscription service content registered by the user is greater than the maximum number of the temporary terminals permitted to use the subscription service content if the user terminal is a temporary terminal.

The operation support system 43 may further include a receiving unit, a determination unit, and an authorization unit.

The receiving unit is configured to receive the service subscription request transmitted from the user terminal, where the request carries the ID of the user terminal.

The determination unit is configured to determine whether the user terminal is an activated terminal according to the ID of the user terminal, which is specifically that the determination unit queries whether the user terminal is an activated terminal from the content protection system according to the ID of the user terminal.

The authorization unit is configured to allocate the authorization to the user terminal when the determination result of the determination unit is that the user terminal is an activated terminal, which is specifically that the authorization unit notifies the content protection system of permitting the user terminal to acquire the authorization of the service.

The operation support system 43 may further include a provision unit.

The provision unit is configured to provide the maximum number of the user terminals permitted to use the subscription service content to the content protection system.

The user terminal 41 may further include a transmission unit, a receiving unit, and a using unit.

The transmission unit is configured to transmit the service subscription request to the operation support system, where the request carries the ID of the user terminal.

The receiving unit is configured to receive the authorization allocated to the user terminal by the operation support system according to the ID of the user terminal.

The using unit is configured to use the subscription service content according to the authorization received by the receiving unit.

The receiving unit may be further configured to receive the authorization delivered by the content protection system according to the notification received from the operation support system of permitting the terminal to acquire the authorization of the service.

The transmission unit may be further configured to transmit a login authentication request to the operation support system; and transmit the registration request of using the subscription service content to the content protection system according to information for instructing the user terminal to register with the content protection system received by the receiving unit. The receiving unit may be further configured to receive an authentication response message returned from the operation support system, where the message carries the information for instructing the user terminal to register with the content protection system.

When the user terminal is a permanent terminal, the using unit may further include a storage unit, and a decryption unit.

The storage unit is configured to store the authorization provided by the content protection system.

The decryption unit is configured to decrypt the encrypted service content on line or off line according to the authorization acquired from the content protection system.

When the user terminal is a temporary terminal, the deployment unit may further include a decryption unit, a status acquisition unit, and a control unit.

The decryption unit is configured to decrypt the encrypted service content on line according to the authorization acquired from the content protection system.

The status acquisition unit is configured to regularly acquire an activation status of the temporary terminal from the content protection system.

The control unit is configured to prohibit or permit the temporary terminal to use the service content according to the activation status of the temporary terminal acquired by the status acquisition unit.

According to the method and system for using the subscription service content according to the embodiments of the present invention, when the user terminal needs to use the subscription service content, if the number of the user terminals using the subscription service content registered by the user is not greater than the maximum number of the user terminals permitted to use the subscription service content, the user terminal is activated, so that the user terminal can acquire the authorization from the content protection system, and use the service content according to the authorization, so the user can conveniently use the subscription service content at different terminals while unauthorized spread of the service content is avoided.

Persons of ordinary skill in the art should understand that all or a part of the steps of the method according to the embodiments of the present invention may be implemented by a computer program instructing relevant hardware. The program may be stored in a computer readable storage medium. When the program is run, the steps of the method according to the embodiments of the present invention are performed. The storage medium may be a magnetic disk, an optical disk, a ROM or a RAM.

The method and system for using the subscription service content of the present invention are described in detail above. The principle and implementation of the present invention are described herein through specific examples. The description about the embodiments of the present invention is merely provided for ease of understanding the technical solutions disclosed in the present invention. Persons of ordinary skill in the art can make variations and modifications to the present invention in terms of the specific implementations and application scopes according to the ideas of the present invention. Therefore, the specification shall not be construed as limiting the present invention.

What is claimed is:

1. A method for using subscription service content, comprising:
receiving by a content protection system, a registration request transmitted from a user terminal for using subscription service content, wherein the registration request carries an identifier (ID) of the user terminal, and the user terminal is one of: a permanent terminal or a temporary terminal, and wherein the subscription service content is provided by a content distribution system apart from the content protection system;
determining by the content protection system, whether a number of registered user terminals using the subscription service content registered by the user is greater than a maximum number of user terminals permitted to use the subscription service content according to the ID of the user terminal, wherein the maximum number of the user terminals permitted to use the subscription service content is provided by the user to a content protection system;
activating the user terminal by the content protection system, such that the user terminal is enabled to receive the subscription service content from the content distribution system, according to the ID of the user terminal, if the number of the registered user terminals using the subscription service content registered by the user is not greater than the maximum number of the user terminals permitted to use the subscription service content; and
delivering, by the content protection system, based on a determination that the number of the registered user terminals using the subscription service content registered by the user is not greater than the maximum number of the user terminals permitted to use the subscription service content, a key for decryption of the subscription service content encrypted by the content protection system to the user terminal;
requesting, by the user terminal, after receiving the key, the subscription service content from the content distribution system;
delivering, by the content distribution system, the subscription service content encrypted by the content protection system to the user terminal; and
decrypting, by the user terminal, the service content provided by the content distribution system using the key.

2. The method for using subscription service content according to claim 1, further comprising: transmitting a service subscription request to an operation support system which is apart from the content protection system, wherein the request carries the identifier (ID) of the user terminal; and receiving authorization which is allocated to the user terminal by the operation support system according to the ID of the user terminal, and using the subscription service content according to the authorization;
transmitting a login authentication request to the operation support system, wherein the request carries a user name and a password; and receiving an authentication response message returned from the operation support system, wherein if the user name and the password are valid, the message carries information for instructing the user terminal to register with a content protection system;
wherein when the user terminal is the permanent terminal, the receiving the authorization which is allocated to the user terminal by the operation support system according to the ID of the user terminal, and using the subscription service content according to the authorization comprise:
acquiring, by the permanent terminal, the authorization from the content protection system, and storing the authorization in the permanent terminal locally; and
acquiring, by the permanent terminal, encrypted service content from a content distribution system, and decrypting the encrypted service content on line or off line according to the authorization acquired from the content protection system.

3. The method for using subscription service content according to claim 1, wherein the registration request is initiated by the user terminal according to registration address and port information of the content protection system, wherein the registration request further carries a user name that the user terminal belongs to.

4. The method for using subscription service content according to claim 1, further comprising:
wherein if the user terminal is the permanent terminal, determining whether a number of registered permanent terminals using the subscription service content registered by the user is greater than a maximum number of permanent terminals permitted to use the subscription service content, and if the number of the registered permanent terminals using the subscription service content registered by the user is greater than the maximum number of the permanent terminals permitted to use the subscription service content, returning a registration failure response message to the permanent terminal.

5. A method for using subscription service content, comprising:
receiving by a content protection system, a registration request transmitted from a user terminal for using subscription service content, wherein the registration request carries an identifier (ID) of the user terminal, and the user terminal is one of: a permanent terminal or a temporary terminal, and wherein the subscription service content is provided by a content distribution system apart from the content protection system;
determining by the content protection system, whether a number of registered user terminals using the subscription service content registered by the user is greater than a maximum number of user terminals permitted to use the subscription service content according to the ID of the user terminal, wherein the maximum number of the user terminals permitted to use the subscription service content is provided by the user to a content protection system;
activating the user terminal by the content protection system, such that the user terminal is enabled to receive the subscription service content from the content distribution system, according to the ID of the user terminal, if the number of the registered user terminals using the subscription service content registered by the user is not greater than the maximum number of the user terminals permitted to use the subscription service content; and
delivering, by the content protection system, based on a determination that the number of the registered user terminals using the subscription service content registered by the user is not greater than the maximum number of the user terminals permitted to use the subscription service content, a key for decryption of the subscription service content encrypted by the content protection system to the user terminal;
requesting, by the user terminal, after receiving the key, the subscription service content from the content distribution system;
delivering, by the content distribution system, the subscription service content encrypted by the content protection system to the user terminal; and
decrypting, by the user terminal, the service content provided by the content distribution system using the key;
wherein if the user terminal is the temporary terminal, determining whether a number of registered temporary terminals using the subscription service content registered by the user is greater than a maximum number of temporary terminals permitted to use the subscription service content, and if the number of the registered temporary terminals using the subscription service content registered by the user is greater than the maximum number of the temporary terminals permitted to use the subscription service content, activating, by a content protection system, the temporary terminal replacing an originally registered temporary terminal.

6. The method for using subscription service content according to claim 5, further comprising: transmitting a service subscription request to an operation support system, wherein the request carries the identifier (ID) of the user terminal; and receiving authorization which is allocated to the user terminal by the operation support system according to the ID of the user terminal, and using the subscription service content according to the authorization;
transmitting a login authentication request to the operation support system, wherein the request carries a user name and a password; and receiving an authentication response message returned from the operation support system, wherein if the user name and the password are valid, the message carries information for instructing the user terminal to register with a content protection system;
wherein when the user terminal is the temporary terminal, the receiving the authorization which is allocated to the user terminal by the operation support system according to the ID of the user terminal, and the using the subscription service content according to the authorization comprise: acquiring, by the activated temporary terminal, the authorization from the content protection system; acquiring, by the temporary terminal, encrypted service content from a content distribution system, and decrypting the service content on line according to the authorization acquired from the content protection system; acquiring, by the temporary terminal, an activation status of the temporary terminal from the content protection system regularly; and prohibiting or permitting the temporary terminal to use the service content according to the acquired activation status of the temporary terminal.

7. The method for using subscription service content according to claim 5, wherein the registration request is initiated by the user terminal according to registration address and port information of the content protection system, wherein the registration request further carries a user name that the user terminal belongs to.

8. A computer program product comprising computer executable instructions stored on a non-transitory computer readable medium such that when the computer executable instructions are executed, a computer is enabled to execute a method for using subscription service content, wherein the method comprises:
receiving a registration request transmitted from a user terminal for using subscription service content, wherein the registration request carries an identifier (ID) of the user terminal, and the user terminal is one of: a permanent terminal or a temporary terminal, and wherein the subscription service content is provided by a content distribution system apart from the content protection system;
determining whether a number of registered user terminals using the subscription service content registered by the user is greater than a maximum number of user terminals permitted to use the subscription service content according to the ID of the user terminal, wherein the maximum number of the user terminals permitted to use the subscription service content is provided by the user to a content protection system;
activating the user terminal such that the user terminal is enabled to receive the subscription service content from the content distribution system, according to the ID of the user terminal, if the number of the registered user terminals using the subscription service content registered by the user is not greater than the maximum number of the user terminals permitted to use the subscription service content; and
delivering, based on a determination that the number of the registered user terminals using the subscription service content registered by the user is not greater than the maximum number of the user terminals permitted to use the subscription service content, a key for decryption of the subscription service content encrypted by the content protection system to the user terminal;

requesting, after receiving the key, the subscription service content from the content distribution system;

delivering the subscription service content encrypted by the content protection system to the user terminal; and decrypting the service content provided by the content distribution system using the key;

wherein if the user terminal is the permanent terminal, determining whether a number of registered permanent terminals using the subscription service content registered by the user is greater than a maximum number of permanent terminals permitted to use the subscription service content, and if the number of the registered permanent terminals using the subscription service content registered by the user is greater than the maximum number of the permanent terminals permitted to use the subscription service content, returning a registration failure response message to the permanent terminal.

9. A computer program product comprising computer executable instructions stored on a non-transitory computer readable medium such that when the computer executable instructions are executed, a computer is enabled to execute a method for using subscription service content, wherein the method comprises:

receiving a registration request transmitted from a user terminal for using subscription service content, wherein the registration request carries an identifier (ID) of the user terminal, and the user terminal is one of: a permanent terminal or a temporary terminal, and wherein the subscription service content is provided by a content distribution system apart from the content protection system;

determining whether a number of registered user terminals using the subscription service content registered by the user is greater than a maximum number of user terminals permitted to use the subscription service content according to the ID of the user terminal, wherein the maximum number of the user terminals permitted to use the subscription service content is provided by the user to a content protection system;

activating the user terminal such that the user terminal is enabled to receive the subscription service content from the content distribution system, according to the ID of the user terminal, if the number of the registered user terminals using the subscription service content registered by the user is not greater than the maximum number of the user terminals permitted to use the subscription service content; and delivering, based on a determination that the number of the registered user terminals using the subscription service content registered by the user is not greater than the maximum number of the user terminals permitted to use the subscription service content, a key for decryption of the subscription service content encrypted by the content protection system to the user terminal;

requesting, after receiving the key, the subscription service content from the content distribution system;

delivering the subscription service content encrypted by the content protection system to the user terminal; and decrypting the service content provided by the content distribution system using the key;

wherein if the user terminal is the temporary terminal, determining whether a number of registered temporary terminals using the subscription service content registered by the user is greater than a maximum number of temporary terminals permitted to use the subscription service content, and if the number of the registered temporary terminals using the subscription service content registered by the user is greater than the maximum number of the temporary terminals permitted to use the subscription service content, activating, by a content protection system, the temporary terminal replacing an originally registered temporary terminal.

* * * * *